(12) United States Patent
Konduru et al.

(10) Patent No.: US 7,957,402 B2
(45) Date of Patent: Jun. 7, 2011

(54) UDP TO TCP BRIDGE

(75) Inventors: Eswar Konduru, Norcross, GA (US); Jerry Petree, Dacula, GA (US)

(73) Assignee: American Megatrends, Inc., Norcross, GA (US)

( * ) Notice: Subject to any disclaimer, the term of this patent is extended or adjusted under 35 U.S.C. 154(b) by 1624 days.

(21) Appl. No.: 11/199,308

(22) Filed: Aug. 8, 2005

(65) Prior Publication Data

US 2007/0058670 A1    Mar. 15, 2007

(51) Int. Cl.
  *H04L 12/28* (2006.01)
  *H04L 12/56* (2006.01)
(52) U.S. Cl. ......... 370/401; 370/216; 370/248; 370/254
(58) Field of Classification Search .................. 370/465, 370/389, 466, 467, 401
  See application file for complete search history.

(56) References Cited

U.S. PATENT DOCUMENTS

| | | | | |
|---|---|---|---|---|
| 5,452,454 A * | 9/1995 | Basu | ................................ | 713/2 |
| 5,844,905 A * | 12/1998 | McKay et al. | ................. | 370/443 |
| 6,075,796 A * | 6/2000 | Katseff et al. | ................. | 370/466 |
| 6,128,601 A * | 10/2000 | Van Horne et al. | ......... | 705/36 R |
| 6,397,098 B1 * | 5/2002 | Uber et al. | ..................... | 600/431 |
| 6,400,729 B1 * | 6/2002 | Shimadoi et al. | ............. | 370/466 |
| 6,871,284 B2 * | 3/2005 | Cooper et al. | ..................... | 726/1 |
| 6,940,866 B1 * | 9/2005 | Miller et al. | .................. | 370/426 |
| 7,065,482 B2 * | 6/2006 | Shorey et al. | ................. | 709/224 |
| 7,363,378 B2 * | 4/2008 | Holmes et al. | ................ | 709/227 |
| 2003/0021291 A1 * | 1/2003 | White et al. | .................. | 370/466 |
| 2003/0236828 A1 * | 12/2003 | Rock et al. | ..................... | 709/203 |
| 2006/0052099 A1 * | 3/2006 | Parker | ........................ | 455/426.1 |
| 2009/0006023 A1 * | 1/2009 | Tiegs | ............................. | 702/122 |

OTHER PUBLICATIONS

UNIX Network Programming vol. 1, Third Edition: The Sockets Networking API by W. Richard Stevens, Bill Fenner, Andrew M. Rudoff Addison Wesley Professional Nov. 14, 2003.*

* cited by examiner

*Primary Examiner* — Daniel Wu
*Assistant Examiner* — Frederick Ott
(74) *Attorney, Agent, or Firm* — Hope Baldauff Hartman, LLC

(57) ABSTRACT

A bridge module bridges communications between computing systems using the UDP (user datagram protocol) communication protocol and computing systems using the TCP (transmission control protocol) communication protocol. Communications between the bridge and the computing system having UDP communication drivers are handled with the UDP protocol. Communications between the bridge and the computing system having TCP communication drivers are handled with TCP protocol. The UDP computing system sends data packets to the bridge module. The bridge module converts these packets from UDP protocol to packets in TCP protocol and sends them to the TCP computing system. The TCP computing system can send data back to the UDP computing system by sending packets to the bridge module using the TCP protocol. The bridge module will convert the TCP data packets from the TCP computing system to data packets in UDP protocol and forward them on to the UDP computing system.

14 Claims, 6 Drawing Sheets

UDP TO TCP BRIDGE

FIELD OF THE INVENTION

This invention relates to communication protocols layered on top of the internet protocol (IP). More particularly, the invention relates to bridging between the user datagram protocol (UDP) in the transmission control protocol (TCP) so as to communicate between devices that use these protocols.

BACKGROUND OF THE INVENTION

When diagnosing or testing a new system or when configuring firmware on a new motherboard for a computing system, it is desirable to transfer data between the computing system under test and a remote computing system. In the past, this has been accomplished by using a serial port at both of a local computing system under test and the remote computing system. Data tables are transferred serially between the systems.

What is needed is an ability to provide console redirection so that the remote computing system emulates video and input at the local computing system under test. In other words, the video data for a screen shot and a key press for the local computing system are redirected and controlled from the remote computing system.

A problem arises when doing this at the BIOS or DOS program level because, when communicating with the firmware, the complexity and resulting implementation code size dictates the use of the UDP protocol. The remote computing system, on the other hand, communicates using the TCP protocol. Therefore in this exemplary situation, there is a need to bridge between the UDP and the TCP protocols to be able to move the video and key press data between the remote computing system and the local computing system under test.

It is with respect to these considerations and others that the present invention has been made.

SUMMARY OF THE INVENTION

In accordance with the present invention, the above and other problems are solved by providing a bridge module in the communications between a local site containing one or more local computing systems and a remote site containing one or more remote computing systems communicating with the local site. Communications between the local site and the bridge are handled with the UDP protocol. Communications between the bridge and the remote site are handled with TCP protocol. A local computing system opens communications by performing a handshake routine with the bridge module. Once the UDP communication link between the local computing system and the bridge module is established, the local computing system sends data packets to the bridge module using the UDP protocol. The bridge module converts these packets to TCP packets and sends them to the remote computing system. The remote computing system can send data back to the local computing system by sending it to the bridge module using the TCP protocol. The bridge module will convert the TCP data packets from the remote computing system to UDP data packets and forward them on to the local computing system.

The invention maybe implemented as a computer process, a computing system or as an article of manufacture such as a computer program product or a computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages which characterize the present invention will be apparent from a reading of the following detailed description and a review of the associated drawings.

DETAILED DESCRIPTION OF EMBODIMENTS OF THE INVENTION

Figure 1:
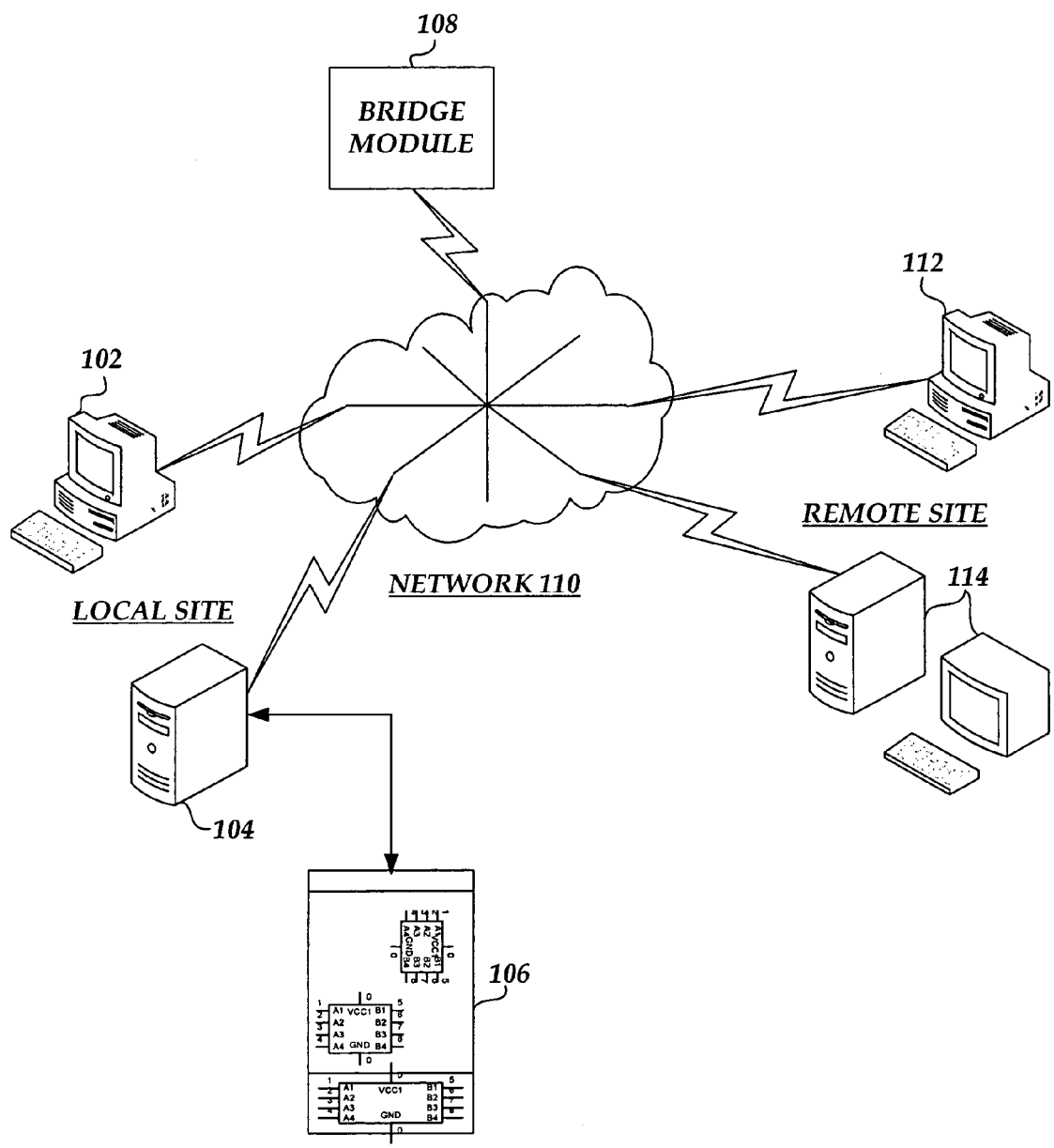
FIG. 1 shows the operating environment of the invention where computing systems at a local site are communicating with computing systems at a remote site through a network such as the Internet.

FIG. 1 shows the operating environment of an embodiment of the invention. The local site has computing systems with their console redirected from computing systems at the remote site. The local site includes a local computing system 102 and a test computing system 104 testing computer cards such as computer motherboards 106. The systems 102, 104 and 106 are running BIOS or DOS and have communication drivers using the UDP protocol to communicate with the bridge module 108 through the network 110. The network in this particular environment is using the internet protocol (IP), and the UDP protocol is layered on top of that IP protocol. Bridge module 108 is also communicating with the remote computing site which includes remote computing systems 112 and 114. Computing systems 112 and 114 include communication drivers that use the TCP/IP communication protocols.

At the local site the UDP protocol is used because of the implementation code size limitations imposed by the firmware software running in computing system 102 and 104. Computing system 104 may be in fact a test system testing multiple circuit chips or cards 106 as in a manufacturing operation for circuit cards or motherboards.

The control of the testing and diagnostic operations on computing systems 102 and 104 are console redirected through the network and through the bridge module to the remote computing systems 112 and 114. Thus, an operator at either computing system 112 or 114 may view the display produced at computing system 102 or 104 and input data back to those computing systems using an input device such as a keyboard or cursor device. The key to accomplishing this redirection is that the bridge module 108 is bridging between the TCP/IP protocol used by the remote computing systems 112 and 114 and the UDP/IP protocol used by the local computing systems 102 and 104.

Figure 2:
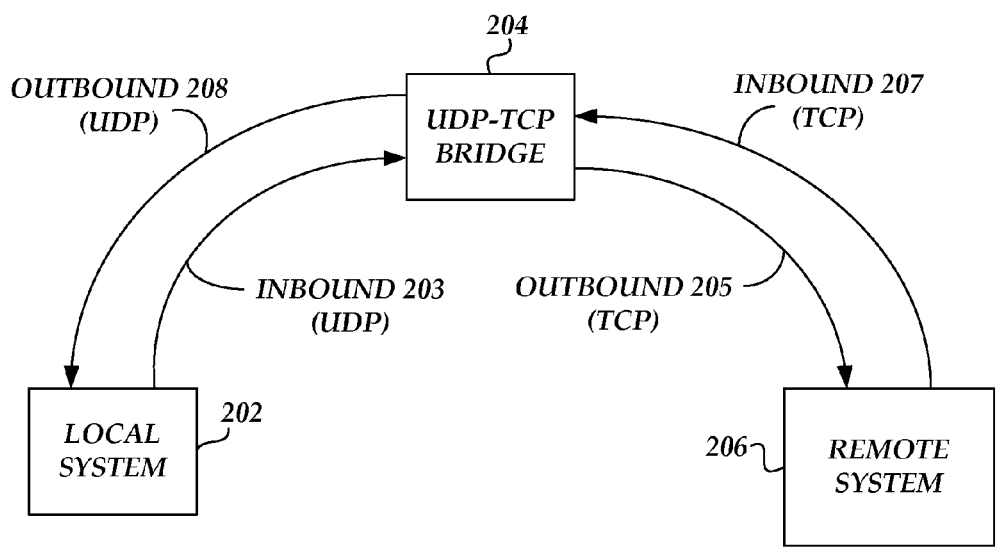
FIG. 2 shows a UDP-TCP Bridge module communicating both with the local computing system and the remote computing system.

FIG. 2 illustrates communication protocols used between a local computing system 202, the UDP-TCP bridge 204, and a remote computing system 206. The flow of data packets is indicated by the arrows between the computing systems and the bridge. Data packets are identified as inbound or outbound relative to the bridge 204. The bridge module may be operating in a separate computing system at a third location on the network, as shown in FIG. 1, or in the remote computing system.

Local computing system 202 sends an inbound data packet to bridge 204 using the UDP protocol. The bridge module 204 converts this data packet to TCP protocol and sends it as an outbound data packet 205 to remote system 206. In the opposite direction, the remote computing system will send inbound data packets 207 to the bridge module 204. The UDP-TCP bridge module 204 will then convert these data packets to UDP data packets and send them as outbound data packets 208 to local system 202. When this communication system is being used for console redirection then these outbound and inbound data packets would include video, i.e., screen shots, and key press or input data.

Figure 3:
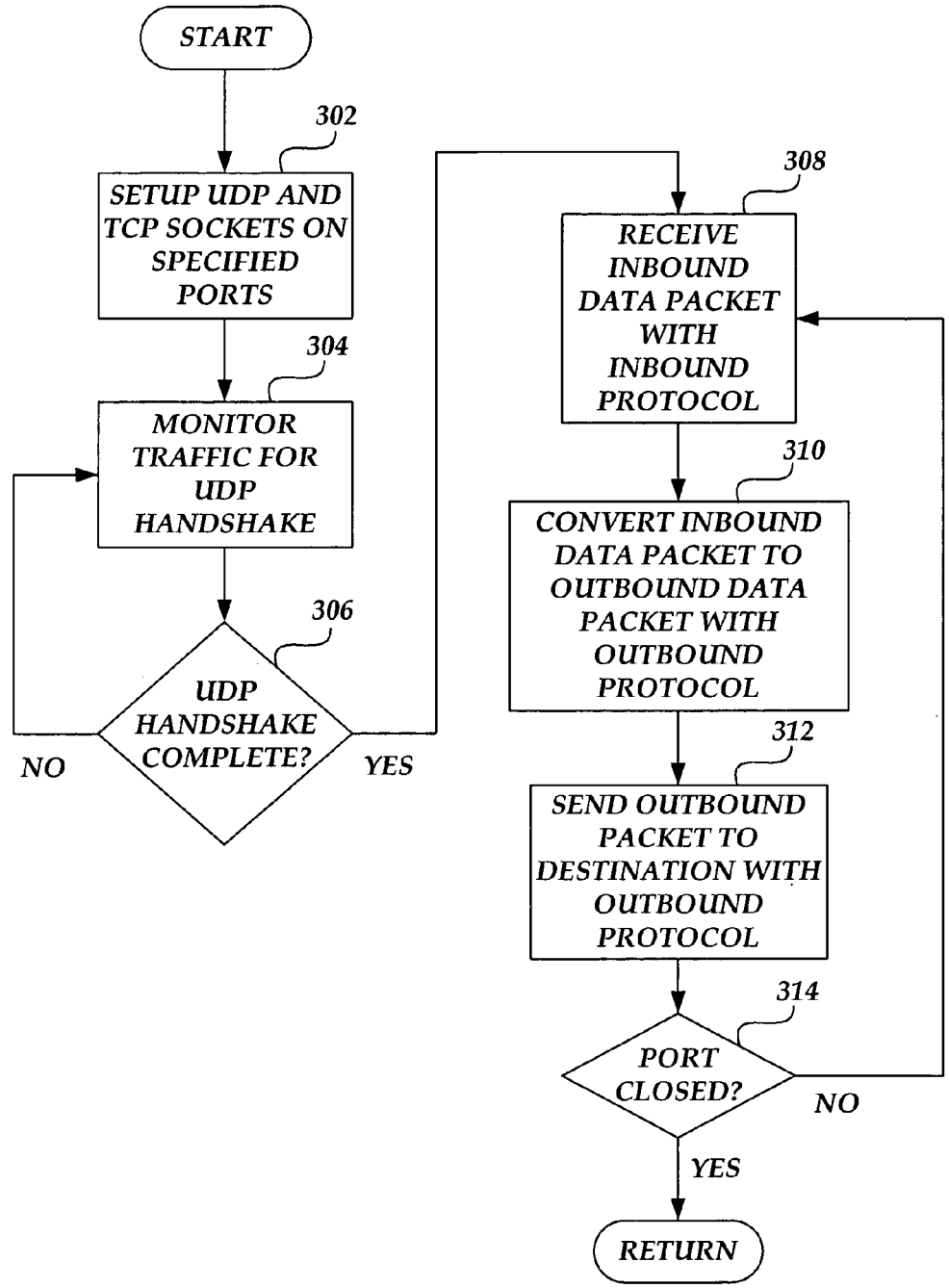
FIG. 3 shows one preferred embodiment of the invention illustrating the operational flow for the UDP handshake between the local computing system and the bridge module, and for converting between the UDP and the TCP protocols when transferring data packets between computing systems after the handshake is complete.

FIG. 3 illustrates one preferred embodiment of the operations performed by the bridge module. Setup operation 302 defines the specified ports for the UDP and TCP sockets at the bridge module. These ports are defined at the IP protocol layer and are extensions of the addresses for the bridge module 204.

Monitor module 304 monitors the communication traffic between the local computing system 202 and the bridge module 204 looking for the UDP handshake. Any data packets sent from the local computing system to the bridge module prior to completion of the handshake will just be dumped and not forwarded to any destination.

Since the UDP protocol is a one-way protocol, the completion of the handshake routine requires a first and second handshake packet from the local communication site and acknowledgement of both of these handshake packets by the bridge module. The handshake conversation flow monitored by the monitor module 304 is illustrated in FIG. 4.

Figure 4:
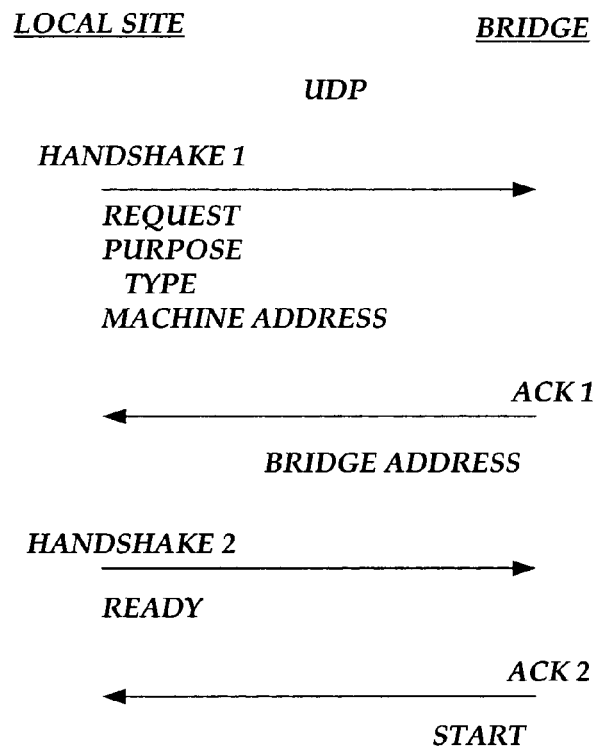
FIG. 4 illustrates the conversation occurring between the local computing system and the bridge module during the handshake routine.

In FIG. 4 handshake #1 packet is sent from a local computing system at the local site to the bridge module. This packet follows the normal UDP format and contains the following information important to the handshake process. First, there is a request for communications. Second, there is an indicator of the purpose of the communications and more particular the type of purpose. For example, the purpose might be redirection and the type might be console redirection. Third, there is a machine address identifying the local computing system sending the handshake #1 packet. This handshake #1 packet may be sent to a specific bridge module or it maybe broadcast on the network to numerous bridge modules.

A bridge module receiving the handshake # 1 request packet will respond with an acknowledgement #1 packet. The ACK #1 packet primarily acknowledges the receipt of the handshake #1 packet. In addition, if the handshake # 1 packet was a broadcast packet, the bridge module will respond with the bridge address in the ACK #1 packet. The bridge address is included so that the local computing system will know how to address the handshake #2 packet.

The handshake #2 packet from the local computing system is sent to the bridge module and includes an indicator that the local computing system is "Ready" to send data through the network to the remote computing system communicating with the bridge module. The bridge module responds with an acknowledgement #2 packet acknowledging the receipt of the handshake #2 packet and including an indicator that the local computing system "Start" sending data packets to the bridge module.

In FIG. 3 the handshake complete test operation 306 is watching for the ACK 2 packet from the bridge module. When that packet is received, the handshake complete test operation knows the handshake operations are complete and branches the operational flow YES to receive inbound data packet operation 308. Receive operation 308 receives at the bridge module an inbound data packet from the local computing system 202. Since this inbound data packet is coming from the local computing system, it will be in an inbound protocol which corresponds to the UDP protocol. Convert module 310 will then convert the inbound data packet to an outbound data packet with the outbound protocol. Since the bridge module is forwarding the data packet onto the remote computing system 206, the outbound protocol will be the TCP protocol. The operational flow of operations to accomplish this conversion are described hereinafter with reference to FIG. 6.

Once the outbound packet has been converted to the outbound protocol, send operation 312 sends the outbound packet using the outbound protocol to the destination computing system which in this case is the remote computing system. Port closed test operation 314 tests whether communication ports for the present communication have been closed. A port on the TCP side is closed by a close packet received from the remote computing system. A port is closed on the UDP side by the lack of communication from the local computing system for a predetermined time interval. If the ports have not been closed, then the operation flow returns to receive the next inbound data packet.

One or more data packets may be sent in the above-described manner from the local computing system to the remote computing system. Conversely, once the communications have been established then the remote computing site may send an inbound data packet in TCP protocol to the bridge module. The convert module 310 will then convert this TCP inbound data packet to a UDP outbound data packet. Send operation 312 will then send this outbound data packet in UDP protocol to the local computing system. Again, port closed test operation 314 will test that the inbound and outbound ports are still open.

Figure 5:
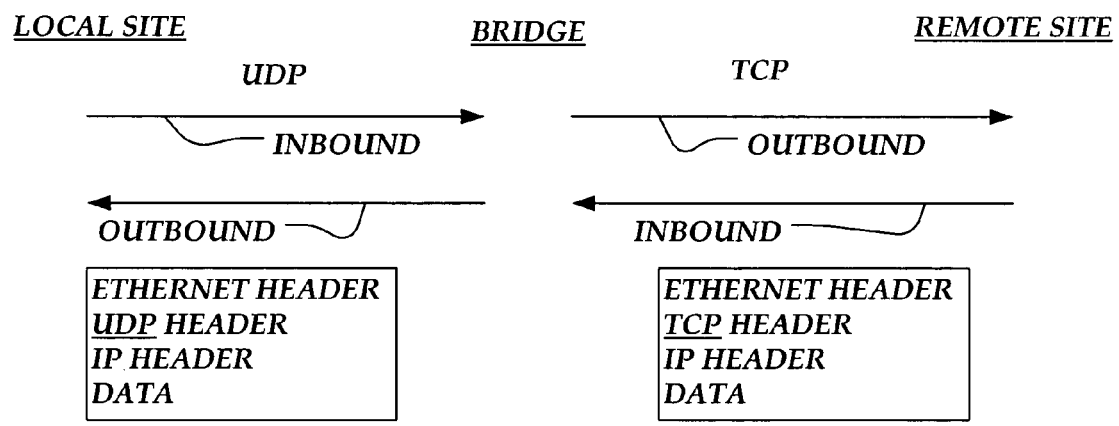
FIG. 5 illustrates the flow of data packets between the local site, the bridge module and the remote site after communications have been established by the handshake routine.

FIG. 5 illustrates the form and flow of inbound and outbound data packets. On the UDP side of the bridge, the data packets include a UDP header as seen in FIG. 5. Conversely, on the TCP side of the bridge of the data packets include a TCP header.

Figure 6:
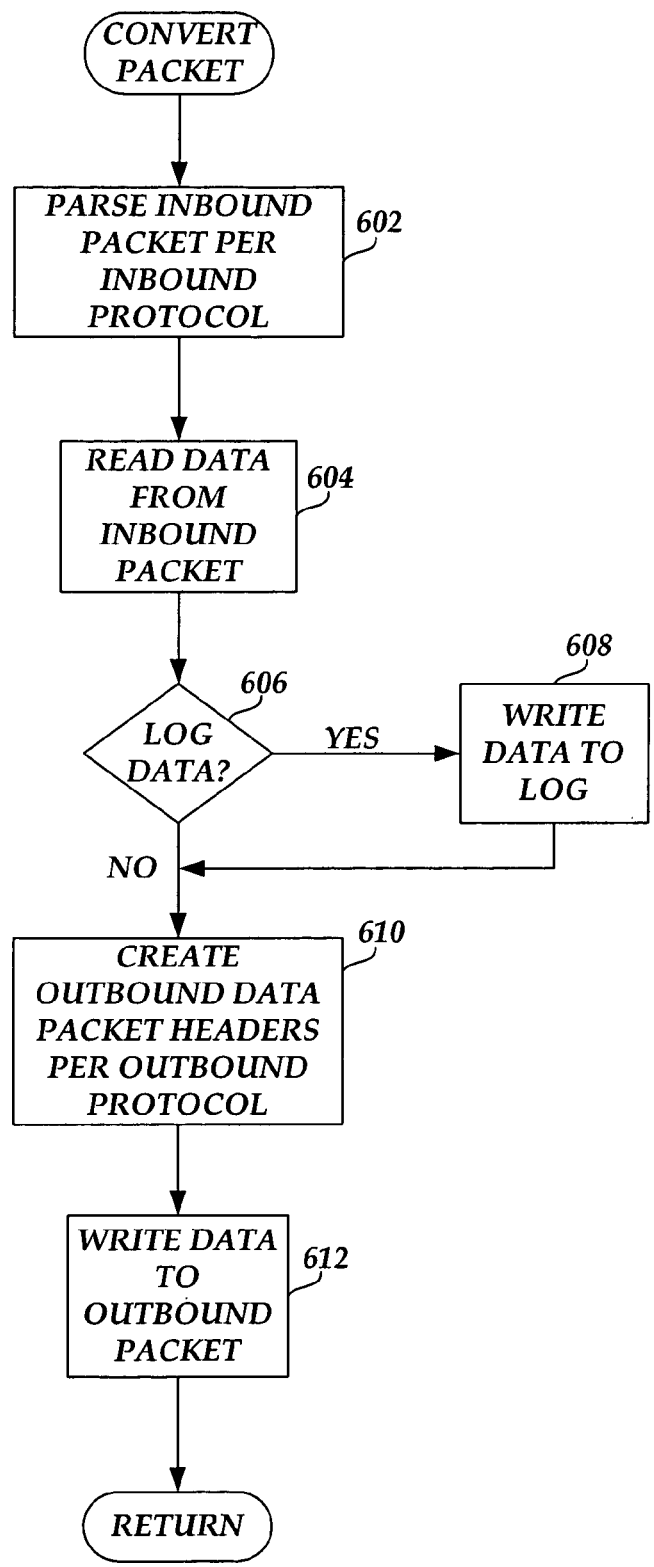
FIG. 6 shows the operational flow of the convert module 310 in FIG. 3.

The operational flow of operations performed by the convert module 310 are illustrated in FIG. 6 and will be described now with reference to FIG. 6 and FIG. 5. In FIG. 6 parse operation 602 uses the data packet format defined according to the inbound protocol to separate the communication headers, i.e. the Ethernet header, the UDP or TCP header and the IP header, from the data packet. Read operation 604 reads the data in the inbound data packet and buffers the data for use in creating the outbound data packet. Log data test operation 606 detects whether a data log for the data is to be created. If there is a data log, then the operational flow branches YES to write operation 608 which writes the data into the data log. If there is no data log, the operation flow branches NO from the log data test operation 606 to create operation 610.

Create operation 610 creates communication headers for the outbound data packet according to the data packet format defined by the outbound protocol. Thus if the packet is being sent from the bridge to the remote computing site, the headers will include an Ethernet header, a TCP header and an IP header. Conversely, if the outbound data packet is being sent from the bridge module to the local computing system then create operations 610 would create an Ethernet header, a UDP header and an IP header.

Write data operation 610 writes the buffer data from the inbound data packet into the outbound data packet. With completion of create operation 610 and write operation 612, the outbound data packet is ready to be sent to its destination. Accordingly, operational flow returns from operation 612 to send operation 312 in FIG. 3.

The logical operations of the various embodiments of the present invention are implemented (1) as a sequence of computer implemented acts or program modules running on a computer system and/or (2) as interconnected machine logic circuits are circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The embodiments of the invention have been described in the exemplary environment of console redirection. Of course, there are other environments where systems and processes of the invention may be applied. Likewise, the embodiments of the invention have been described using the example of a local computing system and a remote computing system. It will be apparent to one skilled in the art, that the embodiments of the invention would be understood just as well as a UDP computing system, i.e. a system communicating with UDP protocol, and a TCP computing system, i.e. a system communicating with TCP protocol.

Lastly, while the invention has been particularly shown and described with reference to preferred embodiments thereof, it will be understood by those skilled in the art that various other changes in the form and details may be made therein without departing from the spirit and scope of the invention.

What is claimed is:

1. A computer-implemented method for bridging communications of data packets between a UDP protocol and a TCP protocol comprising performing computer-implemented operations for:
   monitoring communication traffic for a UDP handshake between a bridge module and a computing system that uses the UDP protocol;
   detecting whether the UDP handshake has been completed;
   upon detecting that the UDP handshake has been completed, starting data packet communication through the bridge module between the computing system that uses the UDP protocol and a computing system that uses the TCP protocol;
   receiving an inbound data packet with an inbound protocol from a first of the two computing systems;
   converting the inbound data packet to an outbound data packet with an outbound protocol for a second of the two computing systems; and
   sending the outbound data packet to the second computing system using the outbound protocol.

2. The method of claim 1 wherein the act of monitoring comprises:
   receiving a request packet from the computing system that uses the UDP protocol;
   sending an acknowledge packet using the UDP communication protocol to the computing system that uses the UDP protocol;
   receiving a second packet from the computing system that uses the UDP protocol, the second packet indicating that the computing system using that uses the UDP protocol is ready to send the data packets; and
   sending another acknowledge packet back to the computing system that uses the UDP protocol indicating that the computing system that uses the UDP protocol may start sending the data packets.

3. The method of claim 2 wherein the act of converting comprises:
   separating communication headers from the inbound data packet;
   reading data from the inbound data packet;
   creating outbound data packet headers according to the outbound protocol for the outbound data packet; and
   writing the data read from the inbound data packet into the outbound data packet.

4. The method of claim 1 wherein the act of converting comprises:
   separating communication headers from the inbound data packet;
   reading data from the inbound data packet;
   creating outbound data packet headers according to the outbound protocol for the outbound data packet; and
   writing the data read from the inbound data packet into the outbound data packet.

5. The method of claim 1 wherein the computing system that uses the UDP protocol is a local computing system and the computing system that uses the TCP protocol is a remote computing system, and wherein the data packets are used for console redirection so that the remote computing system controls the local computing system.

6. A system for bridging communications between two computing systems using different communication protocols, the system comprising:
   a bridge module communicating using a UDP protocol and a TCP protocol;
   a first computing system with communication drivers using the UDP protocol to communicate with the bridge module;
   a second computing system with communication drivers using the TCP protocol to communicate with the bridge module;
   the first computing system and the bridge module using a UDP handshake sequence of packets to establish data communication between the first computing system and the bridge module; and
   the first computing system and the second computing system communicating with each other through the bridge module after data communication is established between the first computing system and the bridge module.

7. The system of claim 6 further comprising:
   the bridge module converting inbound data packets inbound to the bridge module into outbound data packets outbound from the bridge module, whereby inbound data packets formatted using the UDP protocol and received from the first computing system may be converted to outbound data packets using the TCP protocol, and whereby inbound data packets using the TCP protocol may be converted to outbound data packets for transmission to the second computing system using the UDP protocol.

8. The system of claim 6 further comprising:
the bridge module monitoring communication traffic with the first computing system to detect completion of the UDP handshake sequence of packets.

9. The system of claim 8 wherein the UDP handshake sequence of packets comprises the following handshake packets from the first computing system and acknowledge packets from the bridge module:
a handshake #1 packet from the first computing system to the bridge module, the handshake #1 packet requesting communication with the second computing system, identifying a purpose of the communication and stating the address of the first computing system;
an acknowledge #1 packet from the bridge module to the first computing system, the acknowledge #1 packet acknowledging receipt of the handshake #1 packet and stating an address of the bridge module;
a handshake #2 packet from the first computing system to the bridge module, the handshake #2 packet indicating the first computing system is ready to send data packets; and
an acknowledge #2 packet from the bridge module to the first computing system, the acknowledge #2 packet indicating the first computing system may start sending the data packets.

10. A non-transitory computer storage media having computer-executable instructions encoded thereupon which, when executed by a computer, will cause the computer to:
monitor communication traffic for a UDP handshake between a bridge module and a local computing system;
detect whether the UDP handshake has been completed;
upon detecting that the UDP handshake has been completed, start data packet communication between the local computing system and a remote computing system via the bridge module;
receive an inbound data packet with an inbound protocol from one of the local computing system and the remote computing system;
convert the inbound data packet to an outbound data packet with an outbound protocol used by the other of the local computing system and the remote computing system; and to send the outbound data packet to the other computing system using the outbound protocol.

11. The non-transitory computer storage media of claim 10, wherein the act of monitoring comprises:
using a UDP communication protocol to receive at the bridge module a request packet from the local computing system;
using the UDP communication protocol to send an acknowledge packet from the bridge module to the local computing system;
using the UDP communication protocol to receive at the bridge module a ready packet from the local computing system, the ready packet indicating the local computing system is ready to send the data packets; and
using the UDP communication protocol to send a start packet from the bridge module to the local computing system, the start packet indicating that the local computing system may start sending the data packets to the bridge module.

12. The non-transitory computer storage media of claim 11, wherein the act of converting comprises:
parsing communication headers from the inbound data packet;
reading data from the inbound data packet;
creating communication headers for the outbound data packet according to the outbound protocol for the outbound data packet; and
writing data read from the inbound data packet into the outbound data packet.

13. The non-transitory computer storage media of claim 10 wherein the act of converting comprises:
parsing communication headers from the inbound data packet;
reading data from the inbound data packet;
creating communication headers for the outbound data packet according to the outbound protocol for the outbound data packet; and
writing data read from the inbound data packet into the outbound data packet.

14. The non-transitory computer storage media of claim 13 wherein the act of converting further comprises:
detecting whether or not to log the data read from the inbound data packet; and if the data is to be logged, writing the data from the inbound data packet into a data log.

* * * * *

UNITED STATES PATENT AND TRADEMARK OFFICE
CERTIFICATE OF CORRECTION

| | | |
|---|---|---|
| PATENT NO. | : 7,957,402 B2 | Page 1 of 1 |
| APPLICATION NO. | : 11/199308 | |
| DATED | : June 7, 2011 | |
| INVENTOR(S) | : Eswar Konduru and Jerry Petree | |

It is certified that error appears in the above-identified patent and that said Letters Patent is hereby corrected as shown below:

In the Claims

Claim 2, at Column 6, line 10 should read:

2. The method of claim 1 wherein the act of monitoring comprises:
    receiving a request packet from the computing system that uses the UDP protocol;
    sending an acknowledge packet using the UDP communication protocol to the computing system that uses the UDP protocol;
    receiving a second packet from the computing system that uses the UDP protocol, the second packet indicating that the computing system that uses the UDP protocol is ready to send the data packets; and
    sending another acknowledge packet back to the computing system that uses the UDP protocol indicating that the computing system that uses the UDP protocol may start sending the data packets.

Signed and Sealed this
Sixteenth Day of August, 2011

David J. Kappos
*Director of the United States Patent and Trademark Office*